INVENTOR.
JOHN V. McGUIRE
BY
ATTORNEYS

INVENTOR.
JOHN V. McGUIRE
ATTORNEYS

United States Patent Office 3,459,300
Patented Aug. 5, 1969

3,459,300
CONVEYING AND STACKING SYSTEM
John V. McGuire, Deerfield, Ill., assignor to Cheshire Inc., Mundelein, Ill., a corporation of Illinois
Filed Oct. 25, 1967, Ser. No. 677,984
Int. Cl. B07c 5/36, 5/02
U.S. Cl. 209—73          3 Claims

ABSTRACT OF THE DISCLOSURE

A system for stacking series of separate articles on a conveyor capable of actuation in response to a given signal. The output conveyor normally in the "stop" position while the remainder of the machine, i.e., the labeling head and article feeding system are operating. In response to a ZIP CODE change or in response to a predetermined number of mailing pieces having been addressed without a ZIP CODE change, the output conveyor is actuated and moved approximately the distance of a stack while the article feeding and labeling portion of the machine are disengaged. The conveyor is then automatically stopped ready to accept the next successive stack and the addressing machine is started.

Background of the invention

This invention relates to an addressing machine and, more particularly, to a system for conveying and stacking mailing pieces.

In the automatic labeling of postal articles or the like, various methods and machines are known for imparting varying address information to a large number of like articles to be mailed. One such method involves feeding large numbers of unaddressed envelopes, magazines, newspapers or the like beneath a rotating heated transfer wheel. The rotating wheel is oriented to receive and pneumatically hold previously addressed labels coated with a heat activated adhesive on the side of the label remote from the wheel. Further rotation of the wheel brings the adhesive backing of the label into contact with the article to be addressed to effect the transfer of the label from the wheel to the postal article. When the wheel, postal articles, and apparatus for bringing the labels into association with the wheel, are moved in synchronism, the like postal articles can be labeled rapidly, each with different mailing addresses.

In another manner of automatically labeling postal articles, the varying address information may be formed on carbon paper-type labels. In this system, contact between the label and postal article in the presence of heat will transfer the information from the label to the article. The labels, after appropriately marking the postal article, must then be removed from the wheel before the next address bearing label is picked up by the portion of the wheel holding the previously transferred information. A still further manner of labeling is to apply an adhesive to the label which is then applied to the mailing pieces.

Apparatus for carrying out these techniques is disclosed in copending U.S. patent application Ser. No. 505,930, filed Nov. 1, 1965 in the names of Harry V. Kirk and James E. Doane.

After the mailing pieces have been addressed they are transported to a conveyor where the articles were previously shingled on a very slowly moving conveyor. The mailing pieces may be automatically separated into groups according to "ZIP CODE" or other desired arrangements. This was done by offsetting the first or last mailing piece in the group with respect to the remaining pieces on the conveyor.

Such a system is disclosed in copending U.S. application of Kirk and Du Four, Ser. No. 460,796, filed June 2, 1965.

While such apparatus has been found satisfactory, this system requires the constant attention of an operator and the additional operation of gathering for later bundling.

Summary of the invention

It is, therefore, an object of the instant invention to automatically stack ready for bundling, large numbers of postal articles or the like, rapidly and completely.

It is a further object of the invention to automatically actuate an output conveyor which will present separate stacks of articles at the end thereof.

It is a further object of the invention to sense either a ZIP CODE change or a predetermined count of articles to thereby actuate an output conveyor in order to provide separate stacks for each ZIP CODE change or each predetermined count of articles.

These and other objects of the instant invention are achieved by a conveying system capable of actuation in response to a given signal. The output conveyor normally in the "stop" position while the remainder of the machine, i.e. the labeling head and article feeding systems are operating in response to a ZIP CODE change or in response to the machine labeling a predetermined number of mailing pieces without a ZIP CODE change. The output conveyor is actuated and moved approximately the distance of a stack (6" or 12") while the article feeding and labeling portion of the machine is disengaged. The conveyor is then automatically stopped and the machine started.

Brief description of the drawings

For a better understanding of the invention as well as other objects and further features thereof, reference is had to the following detailed description of the invention to be read in conjunction with the accompanying drawings wherein.

Description of the preferred embodiment

Figure 1:
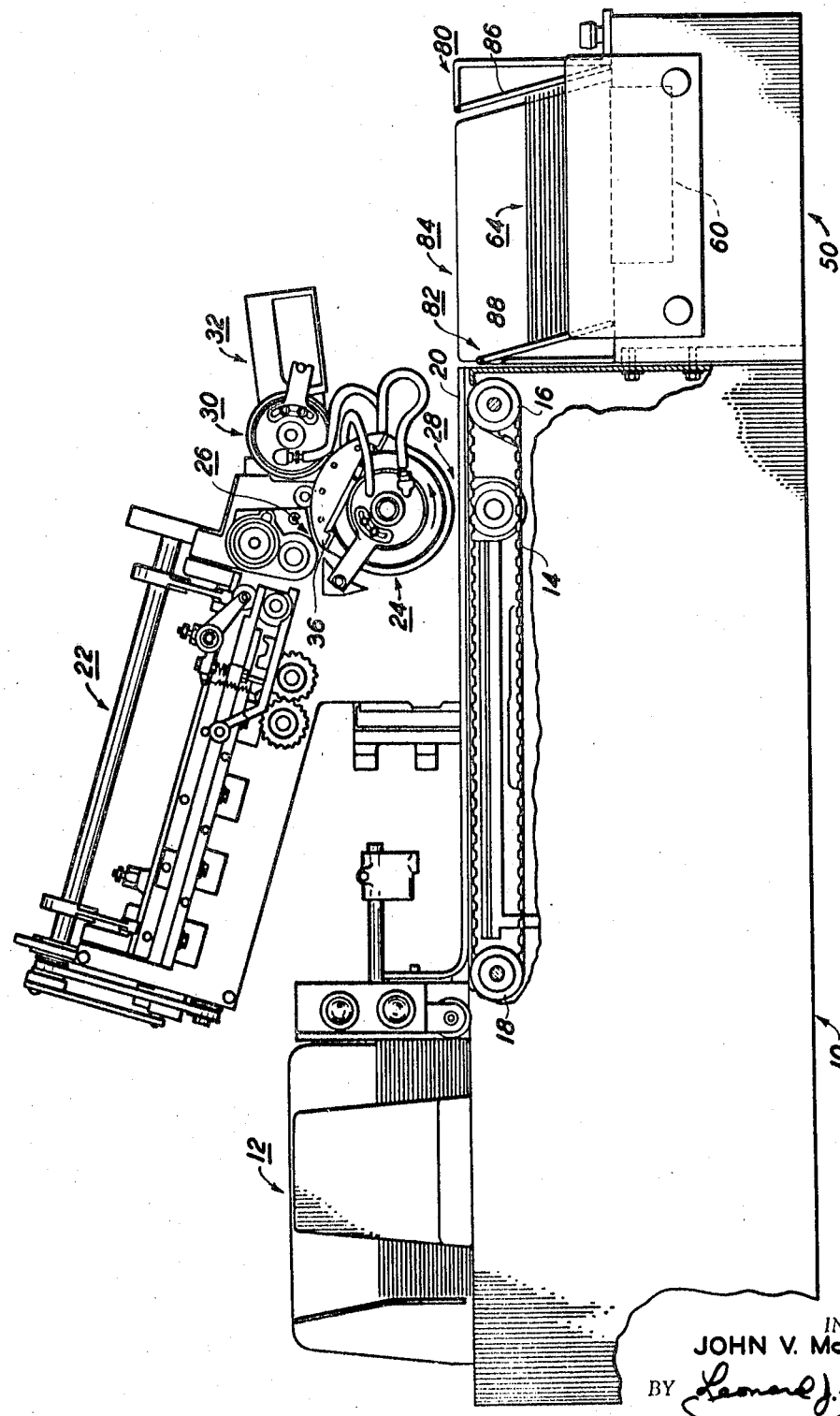
FIG. 1 is a side elevational view of an automatic addressing machine with portions thereof broken away to show internal mechanisms.

Shown in FIGURE 1 is an automatic addressing machine of the type having the conveying system which is the subject matter of the instant invention attached thereto. The overall machine is encased by a general housing 10, parts of which have been removed in FIG. 1 to show internal constructions. The overall machine is shown schematically in FIG. 1 and includes, on the left side thereof, a magazine 12 for the reception of stacked articles to be labeled. The walls of the magazine are adjustable for receiving stacks of materials of varying sizes. Suitable conveying mechanisms may be employed to move the lowermost article within the magazine into association with the timing belt 14 which conveys such article past the labeling instrumentalities in a programmed fashion and onto the conveying system 50. The timing belt is supported on rollers 16 and 18, at least one of which is driven by a suitable source of power not shown. It is this array of elements which permit the seriatim feeding of postal articles across the table 20 of the machine.

Labels to be used for addressing are stored in a label preparation station 22. This station acts to cut, trim and feed the labels sequentially to the moving postal articles via the heat transfer wheel 24. The individual labels are pneumatically picked up by the heat transfer wheel at a label pick-up station 26 and individually moved to an address transfer station 28, which is approximately 180° away. It is during the 180° of contact with the heated vacuum pad 36 that the heat of the vacuum pad 36 partially melts, softens or tackifies either the carbonized information on the label or the heat activated adhesive. A vacuum wheel can be substituted for the heat transfer wheel. In this mode, a small amount of adhesive is applied to the back of the label and the label itself is applied to the postal article.

When the machine is operated to transfer only the information from the label to the postal article, the label itself is pneumatically retained on the heat transfer wheel until it is moved in the direction of the arrow as shown in FIGURE 1 into contact with a vacuum pick-off wheel 30. At this point the used label is pneumatically transferred to the vacuum pick-off wheel for deposition in trough 32. When the machine is operated in a fashion whereby the entire label is transferred to the postal article, the vacuum pick-off wheel 30 trough 32 may be eliminated.

In the alternate mode of operation using a vacuum wheel to apply the label by applied adhesive, the vacuum pick-off wheel 30 and trough 32 are not required. The label preparation or adhesive station may be positioned in the area where the vacuum pick-off wheel and trough are shown in FIG. 1.

As will be understood, when the various elements of the machine, the postal article feeding means and timing belt 14, the label preparation station 22 with its label feeding means, the heat transfer wheel 24 and vacuum pick-off wheel 30, when needed, the machine is capable of the rapid labeling and transporting of large numbers of like postal articles. A more complete description of these mechanisms, as well as their interrelationship with each other can be had by reference to the aforementioned copending patent applications.

The instant invention is primarily concerned with an improved conveying and stacking system capable of affording the entire machine a more efficient operation.

Figure 2:
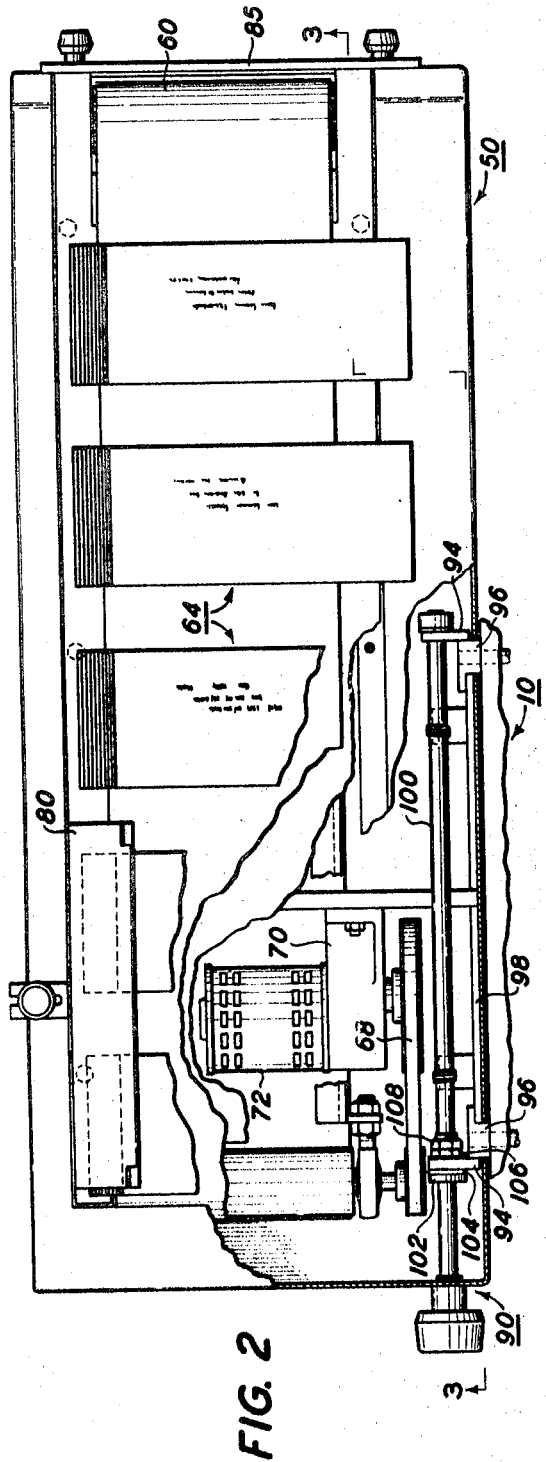
FIG. 2 is a top view of the improved conveyor system which constitutes the basis of the instant invention.
Figure 3:
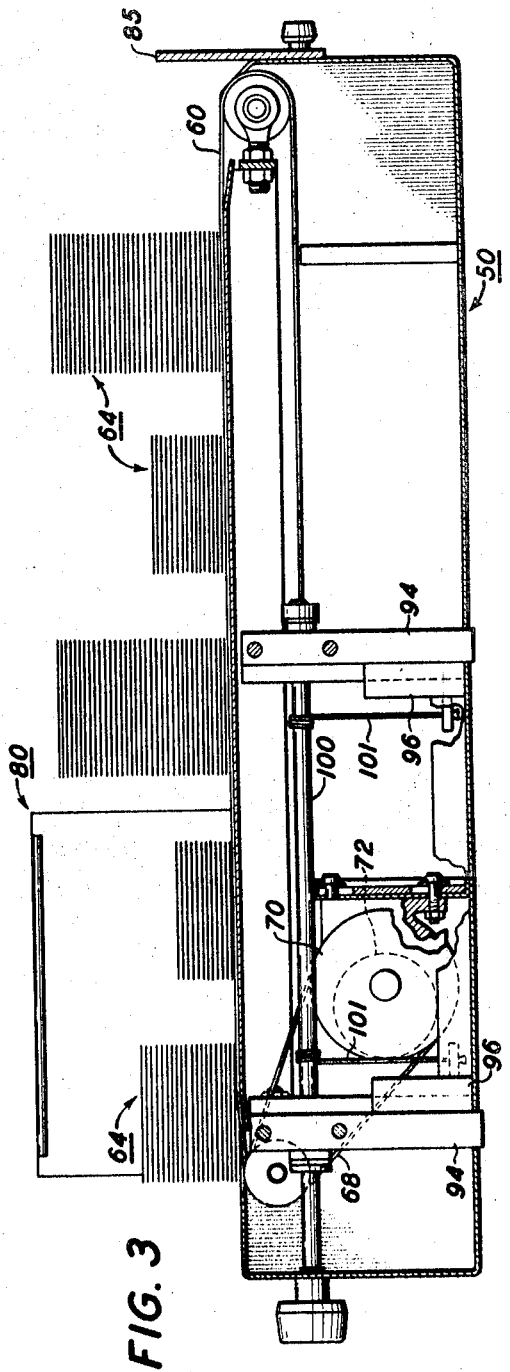
FIG. 3 is a sectional view of the conveyor system taken along line 3—3 of FIG. 2.
Figure 4:
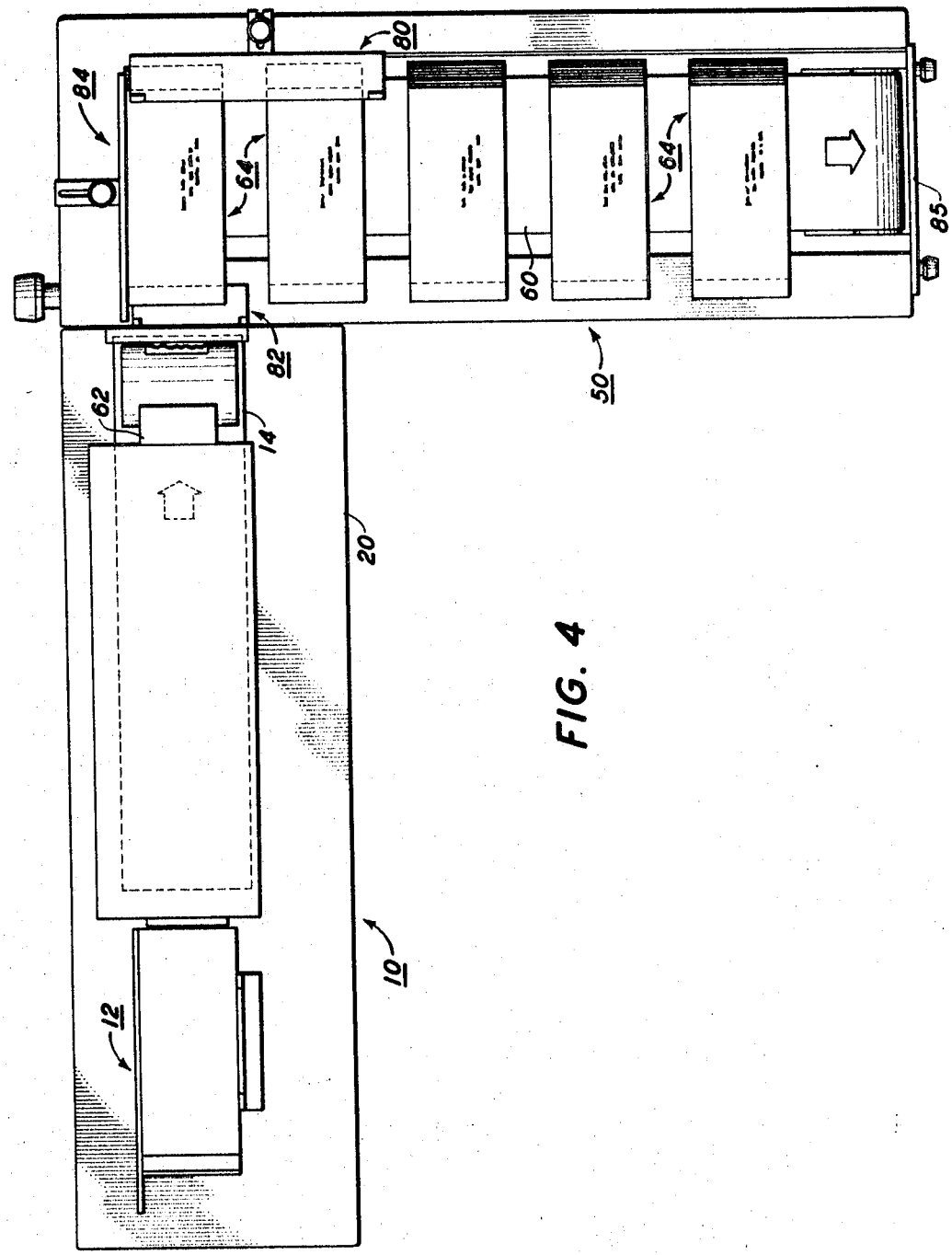
FIG. 4 is a top view of the addressing machine and conveyor system with some parts shown schematically for clarity and simplicity.

Referring to FIGS. 2, 3 and 4 details of the conveying system 50 are shown. The timing belt 14 discharges the labeled mailing piece shown here as envelopes 62 from the right-hand end (FIG. 1) of the housing 10 and onto a take-away conveyor belt 60 which is normally in a stopped position so that as each envelope is discharged from the timing belt 14, it is stacked into a pile 64. The belt 60 is driven by a belt 68 from a speed-reducer 70 operated by a motor 72 independent of the main drive for the machine. The conveying system 50 is provided with a front stop 80, back stop 82 and a side stop 84 to assist each envelope 62 as it is discharged from the machine toward and onto the take-away conveyor 60 for stacking thereon.

As each of the envelopes 62 is discharged from the addressing machine, it is propelled against the front step 80 while any backlash from the inertia of the envelope is prevented by the back stop 82. The side stop 84 is positioned to guide the top edge of the envelope onto the take-away conveyor 60. The front stop 80 and side stop 84 are adjustably positioned on the conveying system 50 to accommodate different size mailing pieces. The front stop 80 and back stop 82 are provided with pivotal plates 86 and 88 which can be adjusted. Thus the front stop 80, the rear stop 82 and the side stop 84 provide a three sided "bin" to receive the mailing pieces 62 and place them into stack 64 on the take-away conveyor 60. The conveying system 50 is provided with an adjustable rear stack plate to prevent any accumulated stock from leaving the conveyor.

The conveying system 50 is adjustably secured onto the housing 10 by an adjustable mounting arrangement 90. A pair of guide blocks 94 are secured to the conveying system 50 and are mounted to slide along the L-shaped guides 96 which are rigidly attached to the housing of the addressing machine at the outer edge thereof. An internal guide member 98 is positioned within the L-shaped guides 96 for sliding movement therealong.

A conveyor lift shaft 100 is rotatably mounted on the guide members 94 within the conveyor. A pair of wire ropes 101 are secured to the conveyor lift shaft. The wire ropes 101 are attached at the ends thereof to the base of the L-shaped guides 96. The conveyor lift shaft 100 is provided with a frictional stop comprising a washer 102 rigidly secured to the shaft and a frictional stop comprising a washer 102 rigidly secured to the shaft and a frictional O-ring 104 mounted adjacent thereto. A pair of locking nuts 106 and 108 are provided for adjusting the frictional contact between the O-ring 104 and the washer 102. As the conveyor lift shaft is rotated thereby shortening the mounted wire rope extending therefrom, the conveyor is raised or lowered and is maintained in that position by the friction between O-ring 104 and washer 102. Depending upon the load on the conveyor the locking nuts 106, 108 may be adjusted to vary the friction between the O-ring 104 and the washer 102 to compensate for any substantial increase or decrease in load on the conveyor.

Figure 5:
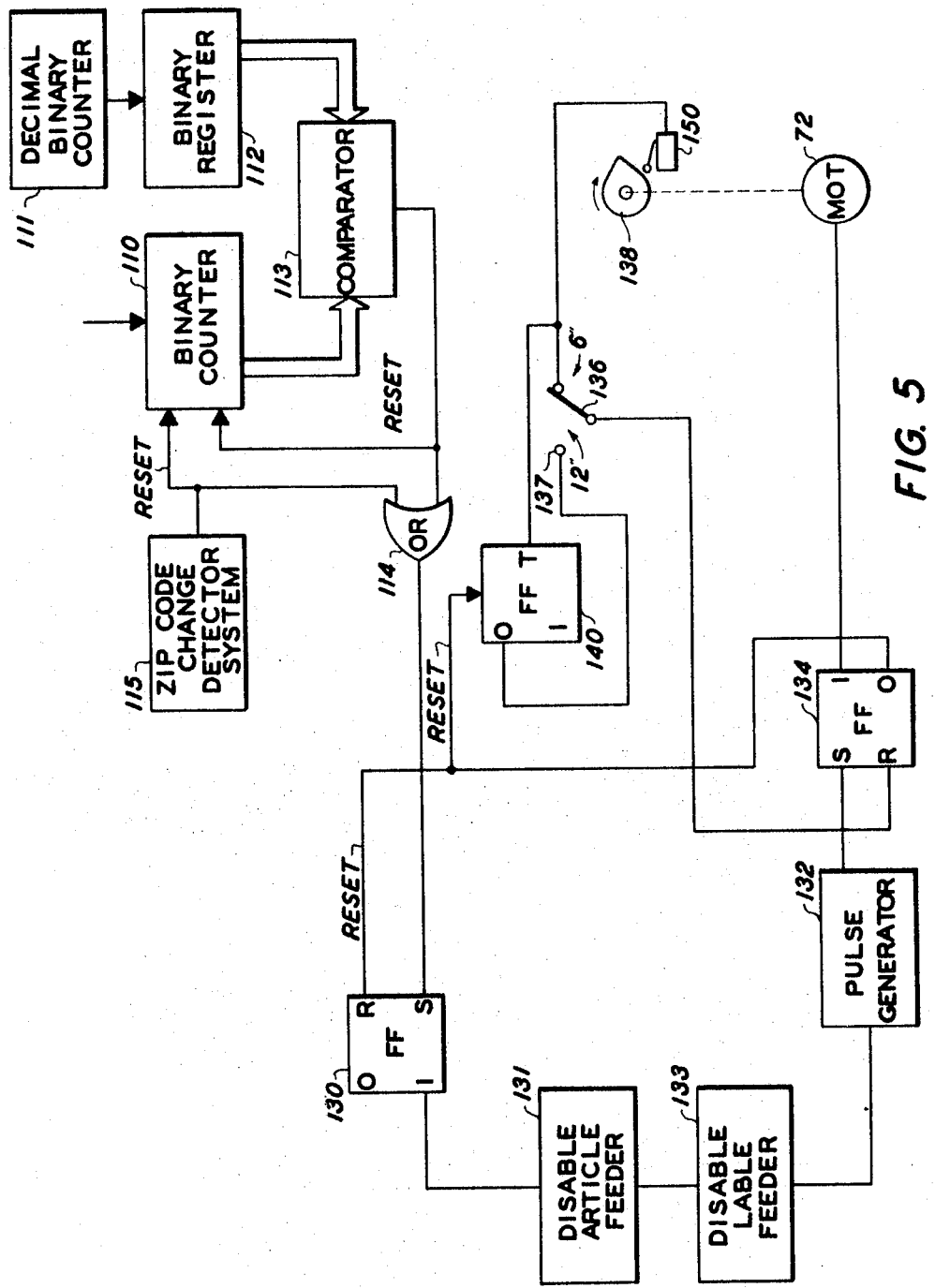
FIG. 5 is an electrical schematic of the conveyor system.

An electric schematic diagram is shown in FIGURE 5. Initially all flip-flops are in a reset condition. As each mailing piece is conveyed through the addressing machine and a label or addresses applied thereto, a count is made on a binary counter 110 for each address applied. The machine may be set by means of a decimal/binary converter 111 which stores in a binary register 112 the maximum number of mailing pieces desired to be placed in each stack. Assuming that all the mailing pieces are in a single ZIP CODE group, the binary counter 110 will continue to count the number of addresses applied and will compare this count with the count in the binary register 112. When the predetermined number of addresses have been applied the count on the binary counter 110 will equal the count stored in the binary register 112, this equality will be detected by a comparator 113 which will generate a pulse which passed by OR gate shown in FIGURE 5. Prior to the attainment of the maximum number of mailing pieces indicated on the register 112 a ZIP CODE change may be indicated by a pulse from a detection system 115 which detects the presence or absence of a predetermined mark such as the one disclosed in copending U.S. patent application to Robert C. Pine, D/1970, Ser. No. 653,143, filed July 13, 1967. The pulse from this system 115 will also be relayed thru the OR gate prior to or consequential with the attainment of the predetermined count. In either case the pulse passed by the OR gate 114 would set flip-flop 130. Also, the pulse generated by either converter 113 or the detector system 115 will serve to reset the binary counter 110 to its initial condition, for example zero. The output from flip-flop 130 will then disable the article feeder 131 and disable the label feeder 133 in proper machine sequence. Upon this disablement, pulse will be generated by the pulse generator 132 of converter design which will set the flip-flop 134. The output from the one side of this flip-flop 134 will actuate the conveyor by energizing the motor 72. The conveyor will be moved either in a short distance or long distance, for example, 6″ or 12″ depending upon the setting of the switch 136. Assuming that a 6″ spacing is desired, a cam in the shaft of motor 172 will actuate a switch 150 thereby providing a pulse at the toggle input of flip-flop 140 which is initially in a reset condition. As FIG. 5 shows, the switch 136 is in such a position to permit a short movement of the conveyor. This is controlled by the switch's position in that this pulse switch 150 is translated directly to the reset input of flip-flop 134 thereby disabling motor 72 after it has moved the conveyor 6 inches.

If a 12 inch movement is desired, the switch 136 is placed so as to contact terminal 137 which is connected to the zero output of flip-flop 140. In this manner, the pulse generated by switch 150 will set flip-flop 140 thereby providing a low level signal at the zero output of this flip-flop. This low level signal has no effect on the condition of flip-flop 134. However, when cam 138 actuates switch 150 again the pulse generated thereby will reset flip-flop 140 thereby generating a reset or high level signal at its zero output which resets flip-flop 134 disabling motor 72.

With the resetting of flip-flop 134, the high level signal at its zero output serves to reset flip-flops 130 and 140 accordingly. Thus the machine is reactivated and the conveyor system ready for the acceptance of the next stack.

While the invention has been described with reference to the structure disclosed herein, it is not confined to the details set forth, and this application is intended to cover such modifications or changes as may come within the purposes of the improvements or the scope of the following claims.

What is claimed is:

1. A system for stacking series of separate articles into stacks including
   a conveyor onto which said articles are placed in stacks,
   means for individually positioning the articles on said conveyor and to arrange the same in stacks,
   drive means associated with the conveyor for moving the same a predetermined distance upon actuation thereof whereby the so-placed stacks are moved sequentially,
   means for producing a signal indicative of the presence of a predetermined number of articles placed in a stack by said positioning means,
   detecting means for sensing the presence of a condition of the articles prior to the placing thereof upon the stacks and producing a signal indicative of the presence of the condition, and
   means responsive to either one of said signals for advancing said conveyor said predetermined distance to allow the positioning of the next successive stack on the conveyor.

2. A system as defined in claim 1 wherein the means for producing a signal indicative of the presence of a predetermined number of articles includes a counter adapted to count the articles.

3. A system as defined in claim 1 wherein the detecting means is adapted to sense the presence or absence of a predetermined mark associated with the series of articles.

References Cited

UNITED STATES PATENTS 3,288,038   11/1966   Swartz _____ 93—93.3

ALLEN N. KNOWLES, Primary Examiner

U.S. Cl. X.R.

198—35; 209—74